United States Patent
Hunter et al.

(10) Patent No.: US 7,565,553 B2
(45) Date of Patent: Jul. 21, 2009

(54) SYSTEMS AND METHODS FOR CONTROLLING ACCESS TO DATA ON A COMPUTER WITH A SECURE BOOT PROCESS

(75) Inventors: Jamie Hunter, Bothell, WA (US); Paul England, Bellevue, WA (US); Russell Humphries, Redmond, WA (US); Stefan Thom, Snohomish, WA (US); James Anthony Schwartz, Jr., Seattle, WA (US); Kenneth D. Ray, Seattle, WA (US); Jonathan Schwartz, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 600 days.

(21) Appl. No.: 11/036,415

(22) Filed: Jan. 14, 2005

(65) Prior Publication Data

US 2006/0161790 A1 Jul. 20, 2006

(51) Int. Cl.
*G06F 12/14* (2006.01)
(52) U.S. Cl. .......................... 713/192; 726/34
(58) Field of Classification Search ............... 726/9
See application file for complete search history.

(56) References Cited

U.S. PATENT DOCUMENTS

| | | | |
|---|---|---|---|
| 5,937,063 A * | 8/1999 | Davis ......................... 713/187 |
| 6,189,100 B1 | 2/2001 | Barr et al. .................... 713/182 |
| 6,327,652 B1 | 12/2001 | England et al. ................. 713/2 |
| 6,330,670 B1 | 12/2001 | England et al. ................. 713/2 |
| 6,415,371 B1 | 7/2002 | Nakamura et al. |
| 6,425,084 B1 | 7/2002 | Rallis et al. |
| 6,625,729 B1 | 9/2003 | Angelo et al. |
| 6,643,781 B1 * | 11/2003 | Merriam ...................... 726/35 |
| 6,651,171 B1 | 11/2003 | England et al. ............... 713/193 |
| 6,684,326 B1 * | 1/2004 | Cromer et al. ................. 713/2 |
| 6,757,824 B1 | 6/2004 | England ..................... 713/156 |
| 7,036,023 B2 | 4/2006 | Fries et al. |
| 7,069,445 B2 | 6/2006 | Cheston et al. |
| 7,117,376 B2 * | 10/2006 | Grawrock ................... 380/277 |
| 7,216,369 B2 | 5/2007 | Wiseman et al. |
| 7,237,121 B2 * | 6/2007 | Cammack et al. ........... 713/189 |
| 7,318,150 B2 | 1/2008 | Zimmer et al. |
| 7,360,073 B1 | 4/2008 | Billstrom et al. |

(Continued)

OTHER PUBLICATIONS

Chuang, S.-C., et al., "A Case Study of Secure ATM Switch Booting," Proceedings of the Symposium on Network and Distributed System Security, San Diego, California, Feb. 22-23, 1996, 103-112.

(Continued)

*Primary Examiner*—Christian LaForgia
(74) *Attorney, Agent, or Firm*—Woodcock Washburn LLP (57) ABSTRACT

Systems and methods for controlling access to data on a computer with a secure boot process can provide a highly efficient mechanism for preventing future access to encrypted digital resources. This may be advantageous in a range of scenarios, for example where a computer is sold and assurance is desired that no stray private data remains on the hard disk. Data resources, for example all data associated with one or more particular hard disk partitions, may be encrypted. The decryption key may be available through a secure boot process. By erasing, altering, or otherwise disabling a secret, such as a decryption key or a process that obtains a decryption key, the data formerly accessible using such secret becomes inaccessible.

10 Claims, 8 Drawing Sheets

U.S. PATENT DOCUMENTS

| | | |
|---|---|---|
| 7,376,968 B2 | 5/2008 | Ritz et al. |
| 7,380,136 B2 | 5/2008 | Zimmer et al. |
| 7,386,713 B2 * | 6/2008 | Madter et al. ............... 713/2 |
| 2002/0004905 A1 | 1/2002 | Davis et al. |
| 2002/0087877 A1 * | 7/2002 | Grawrock ............... 713/200 |
| 2002/0099949 A1 | 7/2002 | Fries et al. |
| 2003/0037231 A1 | 2/2003 | Goodman et al. |
| 2003/0046542 A1 | 3/2003 | Chen et al. ............... 713/176 |
| 2003/0233558 A1 | 12/2003 | Lieberman et al. ......... 713/189 |
| 2004/0003288 A1 | 1/2004 | Wiseman et al. |
| 2004/0103299 A1 | 5/2004 | Zimmer et al. |
| 2004/0117318 A1 | 6/2004 | Grawrock |
| 2004/0172534 A1 | 9/2004 | Ogata |
| 2005/0120226 A1 | 6/2005 | Hartel et al. |
| 2005/0182952 A1 | 8/2005 | Shinozaki |
| 2005/0262571 A1 | 11/2005 | Zimmer et al. |
| 2006/0047944 A1 * | 3/2006 | Kilian-Kehr ............... 713/2 |
| 2006/0053302 A1 * | 3/2006 | Yasaki et al. ............ 713/183 |
| 2006/0064752 A1 * | 3/2006 | Wang et al. ............... 726/19 |
| 2006/0155988 A1 | 7/2006 | Hunter et al. |
| 2006/0161790 A1 | 7/2006 | Hunter et al. |
| 2007/0250730 A1 | 10/2007 | Reece et al. |
| 2007/0277051 A1 | 11/2007 | Reece et al. |
| 2008/0025503 A1 | 1/2008 | Choi et al. |

OTHER PUBLICATIONS

Held, G., "Focus on: Encryption Plus," *International Journal of Network Maagement*, Jan.-Feb. 2002, 12(1), 61-66.

Taylor, K., et al., Protect Your Notebook [notebook security], *Personal Computer World*, Jul. 2004, 27(7), 107-109.

Yue-Zhi, Z., et al., "A Customizable Boot Protocol for Network Computing," *Journal of Software*, Mar. 2003, 14(3), 538-546.

In the United States Patent and Trademark Office, Non-Final Office Action in re:. U.S. Appl. No. 11/031,161 filed Jan. 7, 2005, dated Jun. 20, 2008, 15 pages.

In the United States Patent and Trademark Office, Non-Final Office Action in re:. U.S. Appl. No. 11/031,161 filed Jan. 7, 2005, dated Dec. 9, 2008, 12 pages.

In the United States Patent and Trademark Office, Notice of Allowance and Fee(s) in re:. U.S. Appl. No. 11/035,715 filed Jan. 14, 2005, dated Dec. 8, 2008, 10 pages.

In the United States Patent and Trademark Office, Non-Final Office Action in re:. U.S. Appl. No. 11/035,715 filed Jan. 14, 2005, dated Jun. 18, 2008, 18 pages.

In the United States Patent and Trademark Office, Final Office Action in re:. U.S. Appl. No. 11/036,018 filed Jan. 14, 2005, dated Dec. 31, 2008, 10 pages.

In the United States Patent and Trademark Office, Non-Final Office Action in re:. U.S. Appl. No. 11/036,018 filed Jan. 14, 2005, dated Jul. 23, 2008, 14 pages.

* cited by examiner (Prior Art)
Fig. 1

SYSTEMS AND METHODS FOR CONTROLLING ACCESS TO DATA ON A COMPUTER WITH A SECURE BOOT PROCESS

CROSS-REFERENCE TO RELATED APPLICATIONS

This application is related to co-pending U.S. patent application Ser. No. 11/031,161, filed Jan. 7, 2005, entitled "Systems and Methods for Securely Booting a Computer With a Trusted Processing Module."

FIELD OF THE INVENTION

The present invention relates generally to the field of computing. More particularly, the invention provides a mechanism for controlling access to data on a computer with an encrypted disk volume and a secured boot process.

BACKGROUND OF THE INVENTION

The amount and variety of data that computer users store in digital form is ever increasing. As a result, users are increasingly interested in controlling access to their data. One way to control access is to manually encrypt sensitive files, for example by using any of a multitude of commercially available file encryption products. Only those with the decryption key may then decrypt, view, and modify the data. However, encrypting and decrypting files manually each time access is desired is tedious.

Another way to control access to data is through a secure logon process. Certain files can be associated with a user profile on a computer, and that profile can be accessible only to those that know the profile password. Users of the popular MICROSOFT WINDOWS® operating system are familiar with a process whereby a user profile is selected and a password is entered as part of booting a computer. This solution works well for most purposes, however certain security loopholes remain.

First, an attacker bent on accessing sensitive profile data may discover a way to circumvent the logon process. Second, stray data that is left on a machine when the machine is transferred may be inadvertently left in the clear on a machine. For example, some data may not be encrypted as part of a user's profile, but may be instead stored in an easily accessible location for anyone using the machine to stumble upon. A machine transfer may occur by reason of theft, such as the theft of a laptop, but may also occur in a number of other circumstances such as the sale or trade of a computer. Thus, there are multiple ways that sensitive data may be exposed, but no multipronged solution for these security issues.

To address, first, the compromise of sensitive data via a targeted attack, an operating system may be designed to provide some level of trustworthiness as to its behavior. However, the time before an operating system has loaded is particularly vulnerable to attack, since the infrastructure that protects the operating system from attacks may not have been established yet (or may be in the process of being established). Thus, ensuring that an operating system loads in a predictable way is important for protecting the operating system, and a user's sensitive data, from certain classes of attacks.

One type of security breach that can flow from non-secure loading of an operating system relates to the protection of the key (or keys) that enable certain restricted functionality. By way of example but not limitation, the MICROSOFT WINDOWS® operating systems employ a system key, or "SYSKEY," that is used to protect various processes by making the correct performance of those processes dependent on the availability of SYSKEY. For example, the key needed to decrypt private information that is stored by the operating system in encrypted form may be derivable from the SYSKEY.

Conventionally, the keys needed to perform restricted operations are protected by the logon procedure. Typically, the user must correctly authenticate himself (e.g., by providing correct logon credentials, such as a username/password combination) prior to commencing use of the system. Use of the keys is enabled only if the user correctly authenticates, and the system will only permit the user a limited number of tries (e.g., three) before concluding that the user has failed to logon properly. (This type of limit on the number of attempts to logon prevents unauthorized users from enabling use of protected functionality by using a brute force attack to guess the password in the case of, say, a stolen laptop computer.) However, using the logon procedure to protect access to keys assumes that the operating system loader correctly loaded the operating system with the correct logon program, and that the use of the keys has not been otherwise enabled by rogue code that may be running. If a rogue loader was used instead, and the rogue loader causes a rogue logon program to be loaded with the operating system, then the use of keys might be enabled, or the keys might even be divulged, without the correct credentials having been entered. Since the loading of the operating system provides an opportunity for a security breach, protection of the keys in such a situation requires that the loading of the operating system take place under circumstances where it can be verified to take place correctly. Thus, a secure boot process can be used in combination with the protections afforded by a loaded operating system to provide a first layer of protection for the data on a computer. To this end, a secure boot process for a computer enabled with a trusted platform module (TPM) has been developed by MICROSOFT®, as can be understood with reference to U.S. patent application Ser. No. 11/031,161, filed Jan. 7, 2005, entitled "Systems and Methods for Securely Booting a Computer With a Trusted Processing Module." Also related to this application are U.S. patent application Ser. No. 11/035,715, filed Jan. 14, 2005, entitled "Systems and Methods for Boot Recovery in a Secure Boot Process on a Computer with a Hardware Security Module," and U.S. patent application Ser. No. 11/036,018, filed Jan. 14, 2005, entitled "Systems and Methods for Updating a Secure Boot Process on a Computer with a Hardware Security Module." and U.S. patent application Ser. No. 11/036,018, filed Jan. 14, 2005, entitled "Systems and Methods for Updating a Secure Boot Process on a Computer with a Hardware Security Module."

Most TPMs today conform to the TRUSTED COMPUTING GROUP® (TCG) standard, presently available at https://www.trustedcomputinggroup .org/home and entitled "Trusted Platform Module (TPM) Specification Version 1.2." The TPM is a subsystem that may be incorporated into computing platforms to establish trust for the code that is executed by a platform. Standardization of mechanisms for establishing trustworthy code is beneficial because it allows the security and cryptographic community to assess the mechanisms for providing security, and because it promotes customer understanding and trust of new software features. It also encourages innovation in implementing and improving the standard, as contemplated and encouraged by the TCG®. As stated in the TCG® specification, "[m]anufacturers will compete in the marketplace by installing subsystems with varying capabilities and cost points." While the invention provided herein is not limited to platforms implementing the TCG standard, it is operable with such systems and leverages concepts and technologies that can be understood with reference to the TCG® standard.

Even when a secure boot process is used, certain vulnerabilities remain. There is potential for human error in the storage location of protected data and observation of security protocols, which an additional layer of protection may help to abate. For example, users of machines with a secure boot option may not turn the secure boot feature on. This results in a security risk, especially for large businesses with multiple computers that may be transferred many times between people with differing levels of authority to access such data.

SUMMARY OF THE INVENTION

In consideration of the above, systems and methods for controlling access to data on a computer with a secure boot process can provide a highly efficient mechanism for preventing future access to encrypted digital resources. This may be advantageous in a range of scenarios, for example where a computer is sold and assurance is desired that no stray private data remains on the hard disk. Data resources, for example all data associated with one or more particular hard disk partitions, may be encrypted. The decryption key may be available through a secure boot process. By erasing, altering, or otherwise disabling a secret, such as a decryption key or a process that obtains a decryption key, the data formerly accessible using such secret becomes inaccessible.

BRIEF DESCRIPTION OF THE DRAWINGS

The systems and methods for maintaining and updating a secure boot process in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The following detailed description will generally follow the summary of the invention, as set forth above, further explaining and expanding the definitions of the various aspects and embodiments of the invention as necessary. To this end, a computing environment is set forth in FIG. 1 that is suitable to implement the software and/or hardware techniques associated with the invention. A networked computing environment is illustrated in FIG. 2 as an extension of the basic computing environment, to emphasize that modern computing techniques can be performed across multiple discrete devices.

Figure 3:
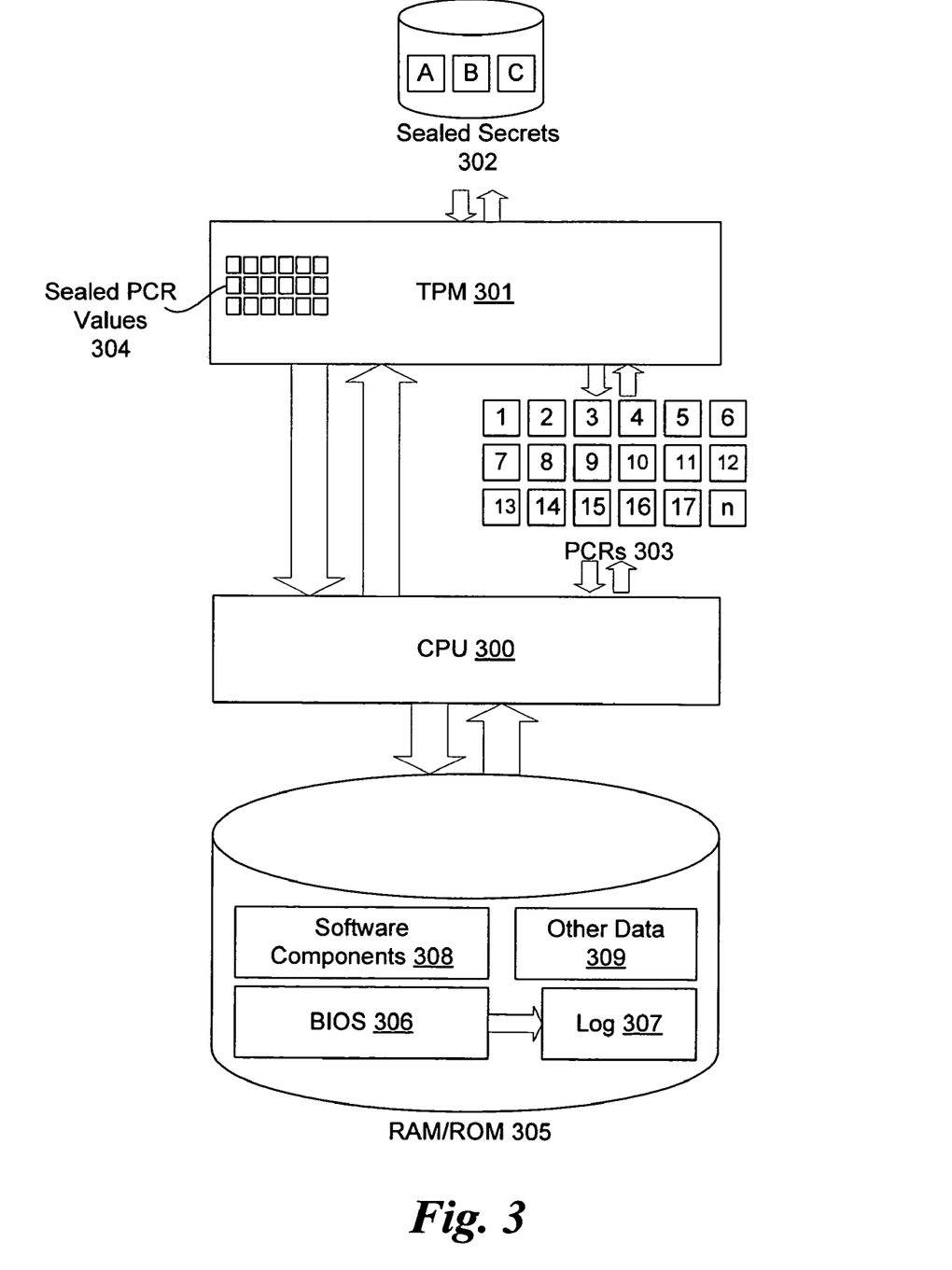
FIG. 3 illustrates an exemplary computing platform on which a secure boot can be implemented. The illustrated platform makes use of a Trusted Platform Module (TPM).
Figure 4:
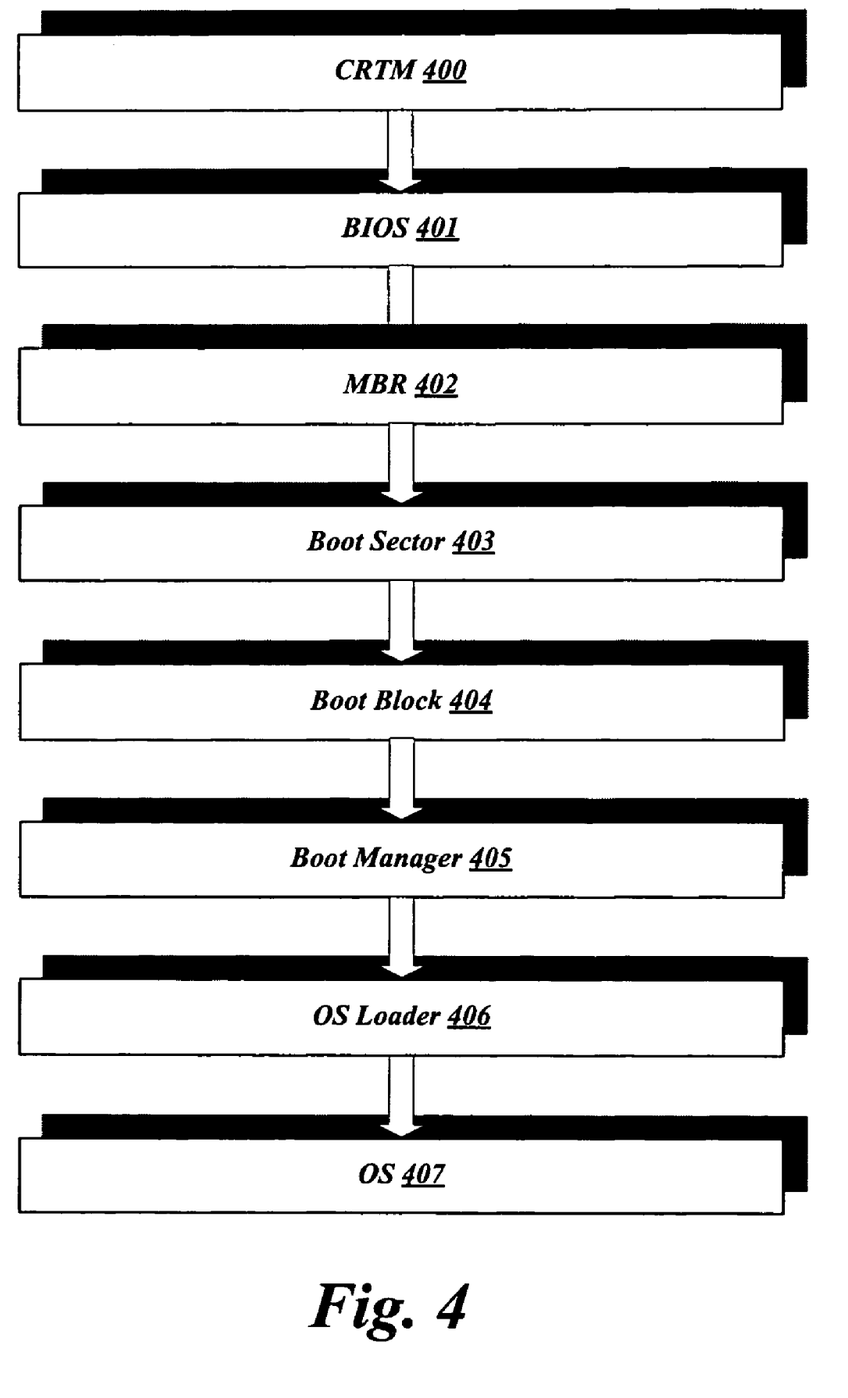
FIG. 4 illustrates an exemplary secure boot process.
Figure 5:
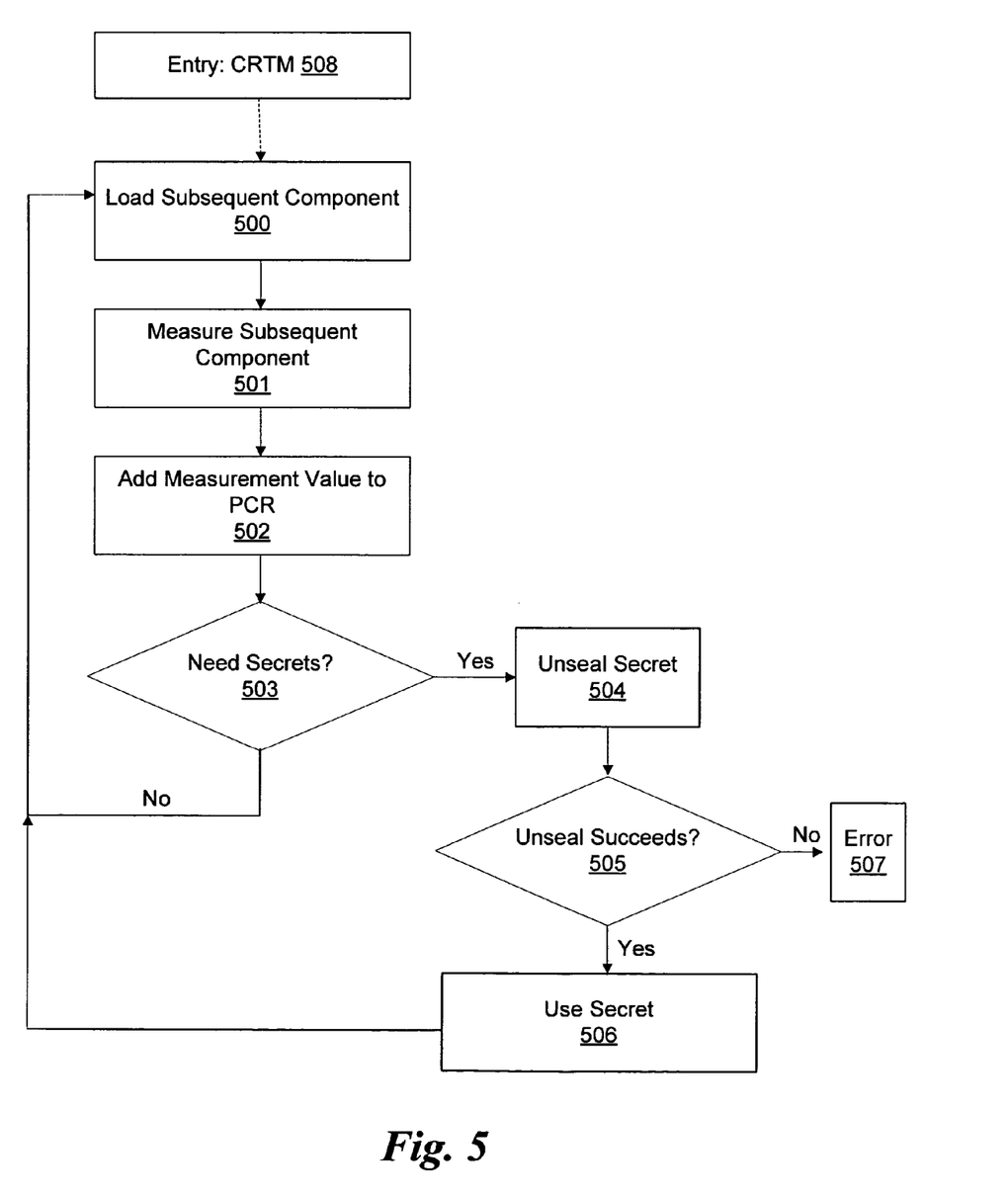
FIG. 5 illustrates a general technique for using a TPM ensure the integrity of measurements loaded into one or more PCRs prior to allowing access to a sealed secret.

Next, an exemplary secure boot process is provided in connection with FIG. 3. The invention is not limited to any particular boot process. However, the described boot process is uniquely suited to the invention by implementing a computing platform that makes use of a Trusted Platform Module (TPM). A TPM can be configured to return secrets to system resources if submitted measurements are correct. Software components that use a TPM in a secure boot process are illustrated in FIG. 4. FIG. 5 shows one general pattern for use of the TPM by the software components such as those of FIG. 4, in which the loading and execution of a next software component may be contingent on the successful unsealing of a secret.

Figure 6:
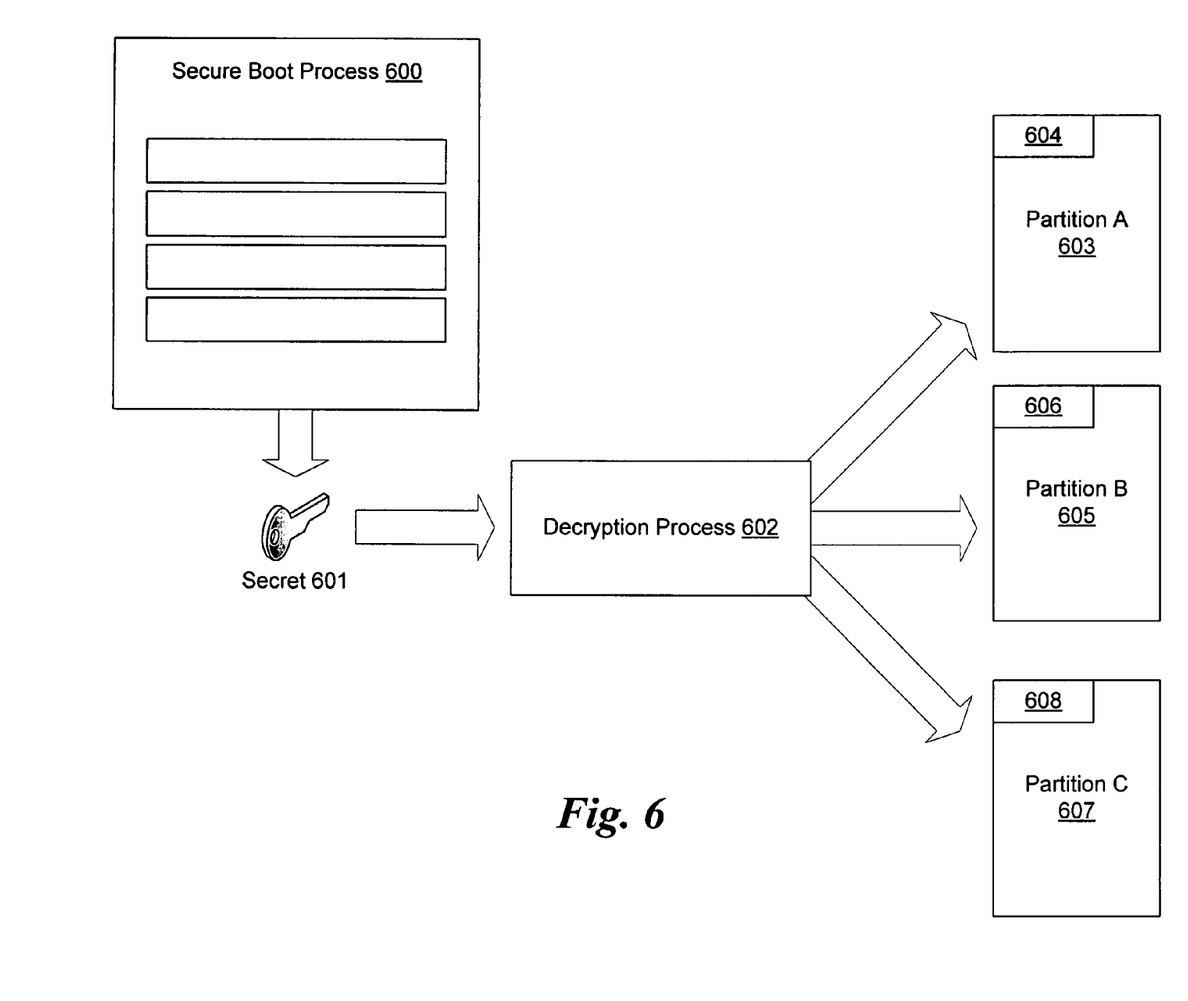
FIG. 6 illustrates systems and methods for accessing encrypted data on a computer with a secure boot process.
Figure 7:
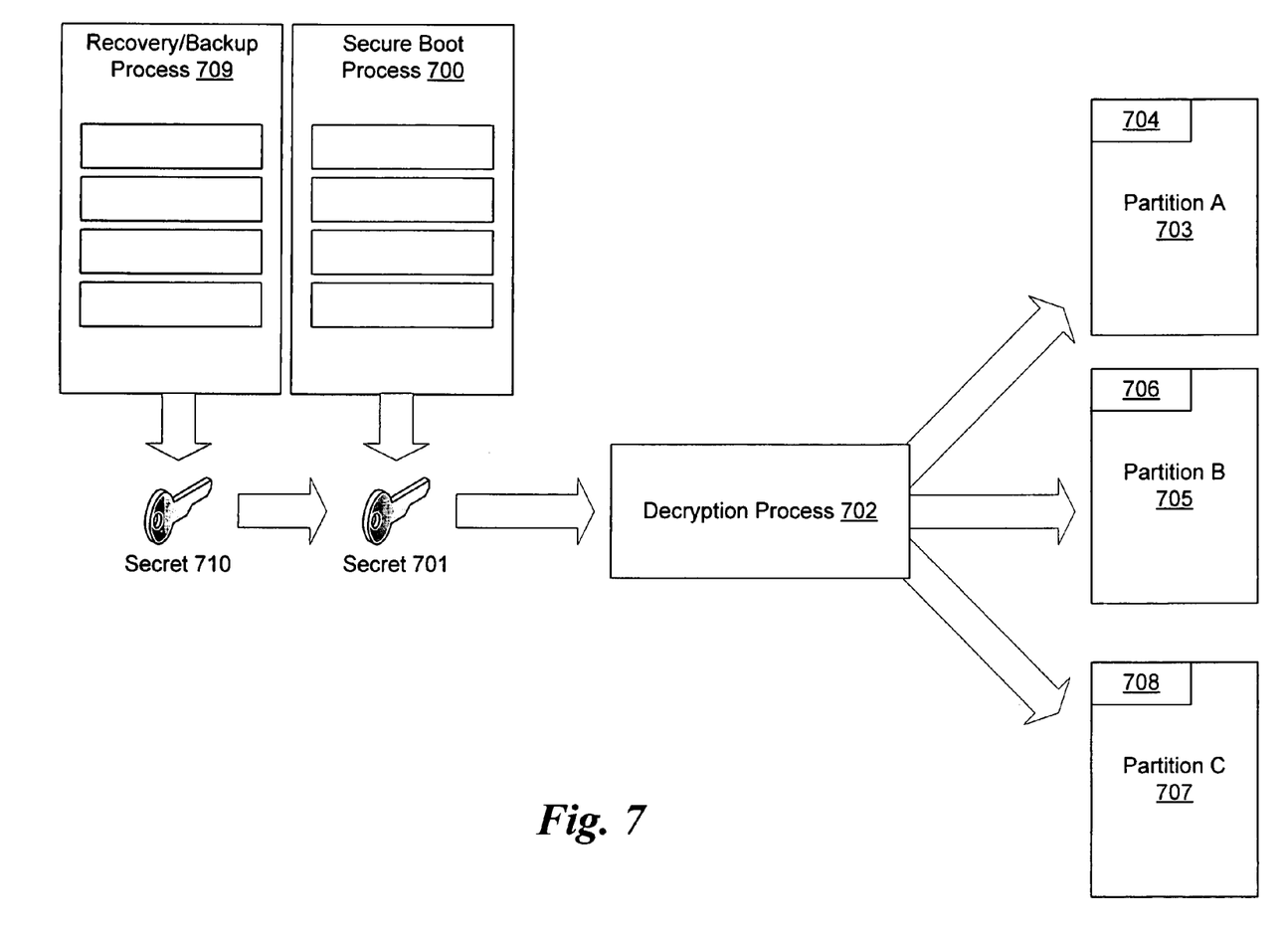
FIG. 7 shows one or more backup processes and/or backup secrets which may be available to access encrypted data. These backups may be available in scenarios where a primary access attempt fails.
Figure 8:
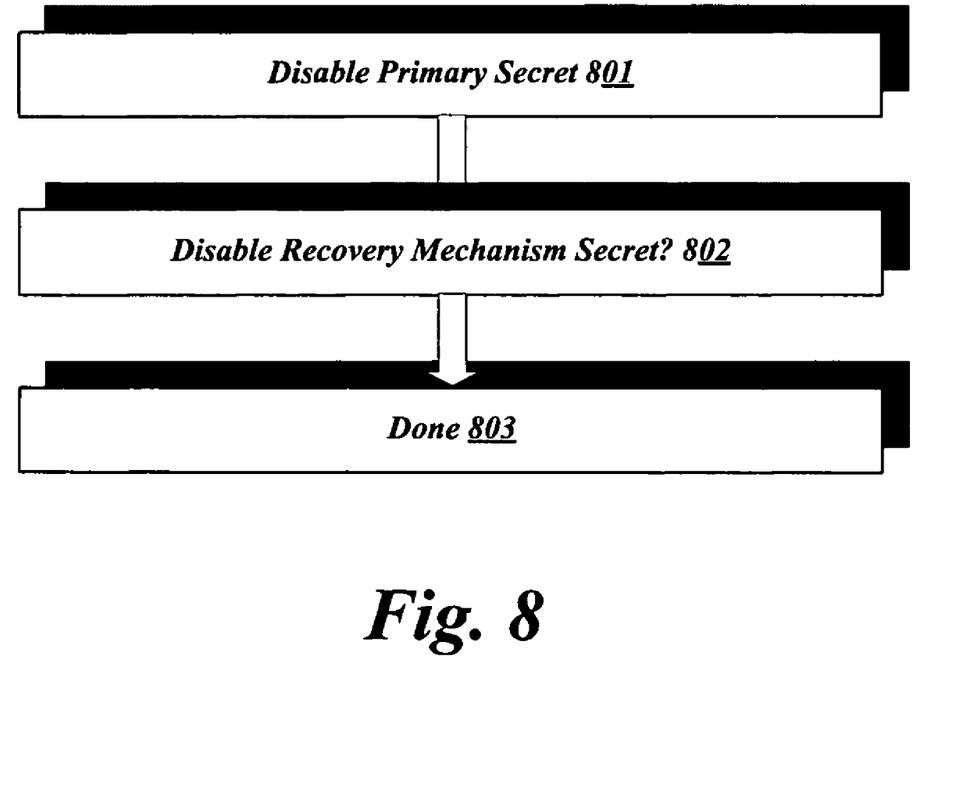
FIG. 8 demonstrates a process for disabling the primary and/or backup secrets to prevent future access to the encrypted data.

Finally, FIG. 6 illustrates systems and methods for accessing encrypted data on a computer with a secure boot process. Data in a partition may be encrypted, and access to such data can be controlled by disabling the means for accessing the encrypted data, for example by scrambling or erasing a decryption key. FIG. 7 shows that one or more backup processes and/or backup secrets may be available to access encrypted data. These backups may be available in scenarios where a primary access attempt fails. Further aspects of the invention can comprise disabling the recovery means for accessing the encrypted data as well as the primary means for doing so. FIG. 8 demonstrates a process for disabling the primary and/or backup secrets to prevent future access to the encrypted data.

Exemplary Computing and Networked Environments

Figure 1:
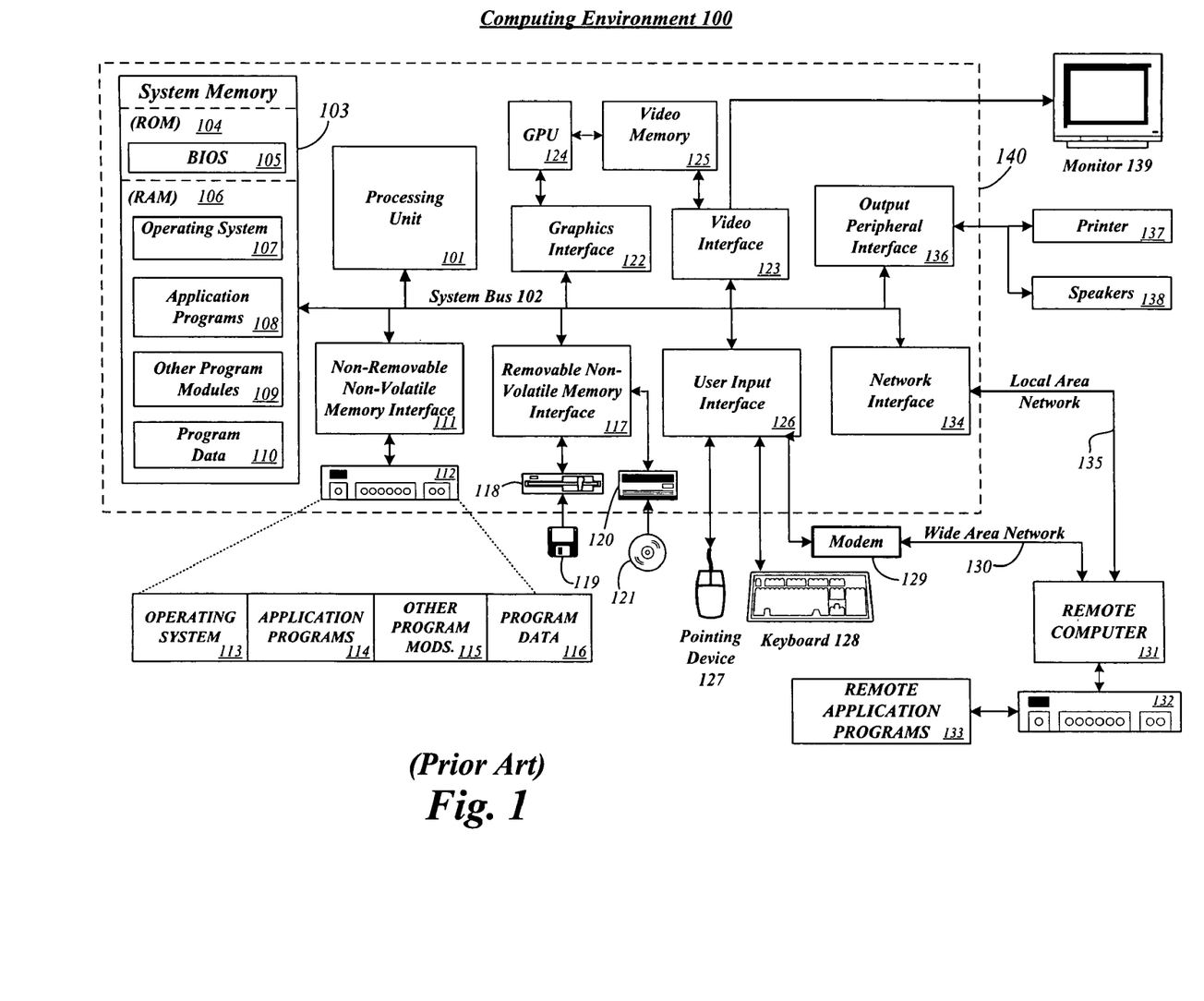
FIG. 1 sets forth a computing environment that is suitable to implement the software and/or hardware techniques associated with the invention.
Figure 2:
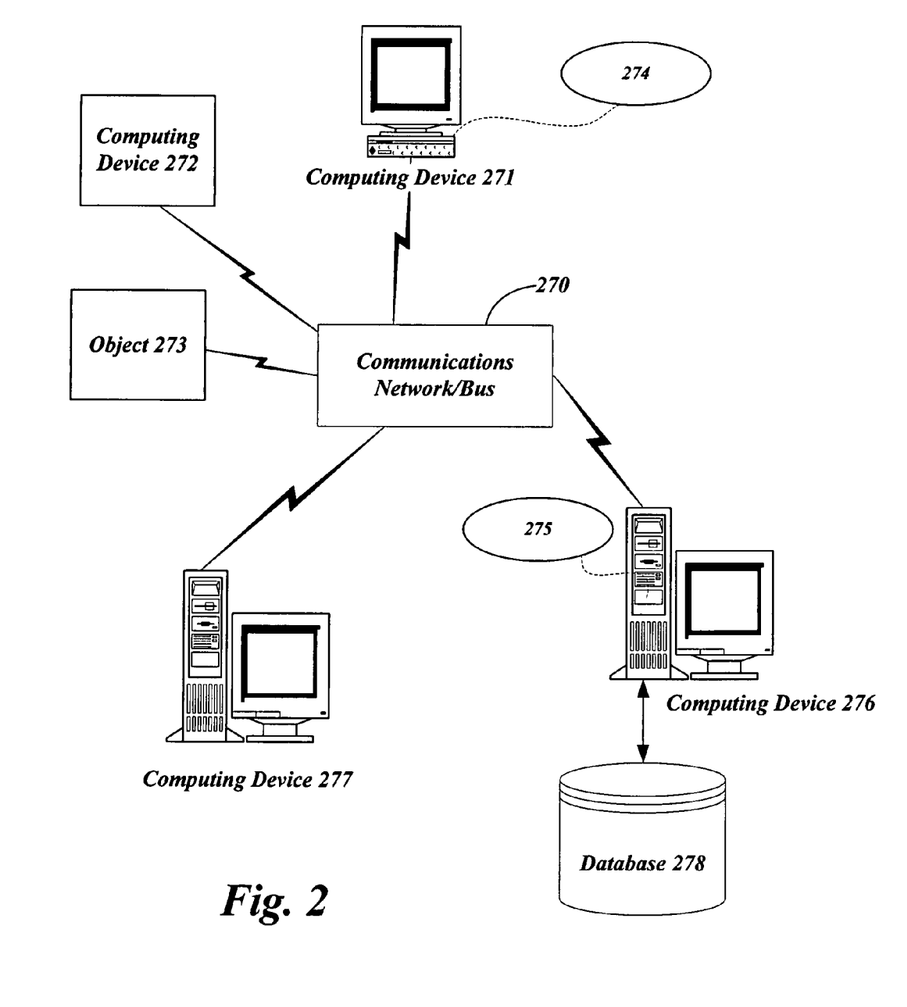
FIG. 2 provides an extension of the basic computing environment from FIG. 1, to emphasize that modern computing techniques can be performed across multiple networked devices.

The computing system environment 100 in FIG. 1 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. FIG. 1 is labeled "prior art" because the components and configuration illustrated in FIG. 1 are known in the art when they are not modified to perform aspects of the inventive embodiments described herein. It should be noted, however, that various of the components of FIG. 1 can operate to carry out aspects of such inventive embodiments, or in conjunction with such inventive embodiments, in which case FIG. 1 would clearly not be considered to illustrate the prior art.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 121. Components of computer 121 may include, but are not limited to, a processing unit 101, a system memory 103, and a system bus 102 that couples various system components including the system memory to the processing unit 101. The system bus 102 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A TPM is not shown in FIG. 1, though such a device may be a part of computers that implement the invention. FIG. 3 shows a TPM that is integrated with some components of a computer, as will be discussed with reference to FIG. 3 below. In a classic embodiment, a TPM may be a hardware chip that is welded to the motherboard of a computer such as that of FIG. 1 for the purpose of providing a range of security functions. However, for the purpose of this specification, it should be understood that a TPM can be implemented in hardware or software, and is defined broadly as a functional unit that can provide those trusted functions that are needed for operation of the invention, i.e. comparison and verification of measurements submitted to it, and release of keys for access to encrypted memory resources. The TPM may also provide a range of other functions, as described in the TCG® specifications for an industry standard TPM.

Computer 121 typically includes a variety of computer readable media. Computer readable media can be any available media that can be accessed by computer 121 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 121. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 103 includes computer storage media in the form of volatile and/or nonvolatile memory such as read only memory (ROM) 104 and random access memory (RAM) 106. A basic input/output system 105 (BIOS), containing the basic routines that help to transfer information between elements within computer 121, such as during start-up, is typically stored in ROM 104. RAM 106 typically contains data and/or program modules that are immediately accessible to and/or presently being operated on by processing unit 101. By way of example, and not limitation, FIG. 1 illustrates operating system 107, application programs 108, other program modules 109, and program data 110.

The computer 121 may also include other removable/non-removable, volatile/nonvolatile computer storage media. By way of example only, FIG. 1 illustrates a hard disk drive 112 that reads from or writes to non-removable, nonvolatile magnetic media, a magnetic disk drive 118 that reads from or writes to a removable, nonvolatile magnetic disk 119, and an optical disk drive 120 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 112 is typically connected to the system bus 102 through an non-removable memory interface such as interface 111, and magnetic disk drive 118 and optical disk drive 120 are typically connected to the system bus 102 by a removable memory interface, such as interface 117.

The drives and their associated computer storage media discussed above and illustrated in FIG. 1, provide storage of computer readable instructions, data structures, program modules and other data for the computer 121. In FIG. 1, for example, hard disk drive 112 is illustrated as storing operating system 113, application programs 114, other program modules 115, and program data 116. Note that these components can either be the same as or different from operating system 107, application programs 108, other program modules 109, and program data 110. Operating system 113, application programs 114, other program modules 115, and program data 116 are given different numbers here to illustrate that, at a minimum, they are different copies. A user may enter commands and information into the computer 121 through input devices such as a keyboard 128 and pointing device 127, commonly referred to as a mouse, trackball or touch pad. Other input devices (not shown) may include a microphone, joystick, game pad, satellite dish, scanner, or the like. These and other input devices are often connected to the processing unit 101 through a user input interface 126 that is coupled to the system bus, but may be connected by other interface and bus structures, such as a parallel port, game port or a universal serial bus (USB). A monitor 139 or other type of display device is also connected to the system bus 102 via an interface, such as a video interface 232. In addition to the monitor, computers may also include other peripheral output devices such as speakers 138 and printer 137, which may be connected through an output peripheral interface 123.

The computer 121 may operate in a networked environment using logical connections to one or more remote computers, such as a remote computer 131. The remote computer 131 may be a personal computer, a server, a router, a network PC, a peer device or other common network node, and typically includes many or all of the elements described above relative to the computer 121, although only a memory storage device 132 has been illustrated in FIG. 1. The logical connections depicted in FIG. 1 include a local area network (LAN) 135 and a wide area network (WAN) 130, but may also include other networks. Such networking environments are commonplace in offices, enterprise-wide computer networks, intranets and the Internet.

When used in a LAN networking environment, the computer 121 is connected to the LAN 135 through a network interface or adapter 134. When used in a WAN networking environment, the computer 121 typically includes a modem 129 or other means for establishing communications over the WAN 130, such as the Internet. The modem 129, which may be internal or external, may be connected to the system bus 102 via the user input interface 126, or other appropriate mechanism. In a networked environment, program modules depicted relative to the computer 121, or portions thereof, may be stored in the remote memory storage device. By way of example, and not limitation, FIG. 1 illustrates remote application programs 133 as residing on memory device 132. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 2. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of FIG. 1, and the further diversification that can occur in computing in a network environment such as that of FIG. 2, the systems and methods provided herein cannot be construed as limited in any way to a particular computing architecture. Instead, the present invention should not be limited to any single embodiment, but rather should be construed in breadth and scope in accordance with the appended claims.

Exemplary Secure Boot Sequence

Embodiments of the invention utilize a secure boot process. An exemplary computer architecture for implementing one type of secure boot process-namely, one using a TPM—is illustrated in FIG. 3. While the TPM contemplated for use in the exemplary secure boot process may be TCG® 1.2 compliant, any functional unit for comparing registered measurements, such as PCRs, and returning trusted results and/or keys for accessing encrypted data may be used.

FIG. 3 presents a CPU 300 with access to memory 305, in a highly generalized view of a computer such as that of FIG. 1. The CPU 300 may rely on a TPM 301 for certain security functions. In general, the CPU 300 may first perform measurements of data involved in a boot process, and those measurements may be securely stored in the TPM 301, as illustrated by the sealed PCR values 304. Note that in various embodiments the various PCR values 304 and 303 illustrated in the figures herein may in fact be stored in one or more single extendable storage locations. The effect of multiple discreet PCRs is created by extending a first PCR value using an algebraic formula, as defined in the TCG® 1.2 specification.

Secrets 302 may be sealed to the particular PCR values 304 in the TPM 301. To retrieve the secrets 302 from the TPM 301, correct PCR values must be entered into PCRs 303. These correct values may be obtained by measuring the same data that was measured to obtain PCR values 304 sealed in the TPM 301. Multiple secrets 302 may be sealed to a variety of PCRs 304. For example, to retrieve a first secret A, it may be required that a correct value be stored in PCR [1], PCR [2] and PCR [3]. To obtain a second secret B, a fourth correct value may be required in PCR [4].

If a measurement is placed in a PCR 303 that does not match a value for that measurement sealed in the TPM 301, then when the TPM 301 is requested to unseal a secret 302, the unseal will fail. If correct measurements are placed in PCRs 303, then the TPM 301 can be trusted to unseal secrets 302 when requested to do so. Therefore, a "correct" measurement, or correct value, for purposes of this application, is a measurement to which a secret 302 is sealed, and thereby permits unsealing of the secret 302 by the TPM 301. Note that a correct measurement could be, in some embodiments, a measurement of malicious code. This is the case, for example, when the initial measurements 304 sealed in the TPM 301 are corrupt.

The secrets sealed to particular measurements may be any data. Typically, secrets 302 will take the form of decryption keys and/or Binary Large Objects (BLOBS). In general, a key provides information that can be used to decrypt data. A sealed BLOB may contain a key as well as other data that may be useful. In this regard, equivalents for various techniques discussed herein may be constructed by substituting keys for BLOBS and vice versa, as will be appreciated by those of skill in the art. Thus, if a CPU 300 submits correct measurements to PCRs in 303, then when a corresponding secret 302 such as a key is requested, the TPM 301 can unseal the secret 302. The key from 302 may then be used to decrypt portions of memory 305 accessible by the CPU 300. In embodiments of the invention, a TPM 301 may be configured to grant access to three secrets, A, B, and C, as shown in FIG. 3. The secrets 302 may be sealed to various required PCR values, and therefore may be accessible only after certain measurements are performed. These three keys, or three secrets, will be referred to here as, first, a boot access only secret, second, a volume-bound secret, and third, a password secret. Disabling any or all of these secrets can prevent access to data on a computer, to the extent that the data is encrypted, and retrieval of a secret to decrypt the data depends on successful boot.

Some or all of memory 305 may be encrypted. Often, memory 305 comprises a hard disk which may be divided into one or more partitions. A partition is a portion of a computer readable medium that is designated for use with a particular operating system. Thus, if just one operating system is available to a computer, the hard disk may have just one partition. If two operating systems are available, the hard disk (or other media accessible by the computer) may have two or more partitions. It will be recognized that any portion of any partition, except for certain dedicated portions, may be encrypted. In preferred embodiments of the invention, full volume encryption is utilized. Full volume encryption is the encryption of substantially all of the data in a partition, and may extend to substantially all the data in all partitions.

TPM related activity may be stored in a log 307. The log 307 may be maintained by the computer's BIOS in some embodiments. Any other process may also be responsible for maintaining a log 307. Thus, if data such as a software component 308 or other data 309 is measured into a PCR 303, the data that was measured may be identified in the log 307. If a secret unseal request is made, the request event may be identified in the log 307. These are but two examples of storing TPM related activity in a log 307, which may contain records for a wide range of other events and activities.

Typically, a TPM 301 operates in conjunction with a Static Root of Trust Measurement (SRTM) for performing trusted measurements and submitting them to a TPM 301. Embodiments of the invention may use an SRTM in this manner, and in this regard the SRTM may be a BIOS standard SRTM used by the various software components (also called processes and RTMs) discussed herein to measure initial disk based boot code. The system may also extend the SRTM to measure other code and critical data involved in the early stages of booting of an operating system so that any early stages of an operating system boot can be measured. Note that PCRs 303 may contain values obtained from anywhere. The values may be measurements of data such as software components 308 or other data 309. The invention is not limited to any exclusive combination of data measurements or other values that are placed in PCRs 303.

In a TPM secured boot process, the arrangement displayed in FIG. 3 may be used to measure the exemplary software components illustrated in FIG. 4, and store the measurements in the PCRs 303. The boot components illustrated in FIG. 4, which may be chosen to be measured by embodiments of the invention, and particularly disk based code components, are known to change rarely, and are subject to an easy attack. Therefore enforcing that certain boot components remain unchanged, unless by qualified maintenance and update processes as described herein, is a relatively small price to pay to significantly enhance data security.

Referring to FIG. 4, a series of software components 400-407 is illustrated to provide an exemplary boot process for a computer. The invention is not limited to the particular components shown, nor to the sequence of components. The illustrated components may be sequentially loaded, starting with the Core Root of Trust for Measurement (CRTM) 400, and ending with the components of an Operating System (OS) 407, which is generalized here as a single software component 407. Loading a component entails giving the component access to the resources of a computer, such as memory and the CPU, so that the instructions of the component can be executed by the CPU. If a component in FIG. 4 is malicious or corrupt, it can be used to circumvent security measures once it is loaded. Thus, a process for securely booting a computer may comprise measuring a component or plurality of components into one or more PCRs 303 prior to allowing the component(s) to execute. Successful boot may be made contingent on secrets 302 sealed to a trusted set of measurements 304 that are sealed in the TPM. Ideally, the secrets are sealed to measurements 304 of trusted code. If the measurements placed in PCRs 303 are correct, then secrets from 302 may be unsealed, allowing a machine to proceed with secure boot. The process of unsealing a secret 302 is illustrated in FIG. 5.

FIG. 5 illustrates a technique for using a TPM ensure the integrity of a subsequent software component prior loading that subsequent component. The steps of FIG. 5 may be carried out by placing appropriate instructions in a series of components, such as the components of FIG. 4. In this regard, the process of FIG. 5 may begin with the execution of a CRTM component 508. A component, such at the CRTM and some or all of the other components of FIG. 4 may bear instructions for measuring another component and placing the result in a PCR, such as from 303 in FIG. 3. A component bearing such instructions is sometimes referred to as a Root of Trust for Measurement (RTM), and may contain instructions for utilizing an SRTM as mentioned above. Thus, if the boot block measures the boot manager, the boot block serves as an RTM for the boot manager.

An RTM can load a subsequent component into memory 500, and then perform a measurement on a subsequent component 501, and add the measurement to a PCR 502. If the RTM needs a secret, such as a key or a BLOB from the TPM 503, then it may request such secrets, and the TPM will release the requested secret(s) only if correct PCR values are loaded for all PCRs needed to access the secret. Thus, an attempt may be made to unseal a secret based on information retrieved from the TPM 504. If the unseal succeeds in step 505, additional steps may be taken, which may comprise loading a subsequent component, as well as other actions described below. If the unseal does not succeed, the values in the PCRs were likely incorrect and thus the executing code may be corrupt. An error may result in step 507 and appropriate measures can be taken to ensure that no access is provided to the sensitive information stored on the computer, for example, by using encryption of the data on the computer's disk and refraining from giving out the decryption key.

Embodiments of the invention may support intentional disabling of keys or other secrets, or processes for obtaining such secrets. When this is done, all future boots of a machine can be made impossible, and any encrypted data accessible that is accessible only after successful boot can be blocked from future access. If processes for maintaining the system, for example by restoring it to a state which will produce correct PCR values, or for authenticating a user to authorize new sealed PCR values exist on a machine, such recovery process can optionally be disabled as well.

FIG. 4 and FIG. 5 may be referred to together to illustrate exemplary secure boot processes for use with the invention. A CRTM 400 can be loaded first, which loads and measures a Basic Input/Output System (BIOS) 401. This measurement can be made, for example, by performing a hash over the BIOS, and then submitting the hash measurement value to a PCR. The BIOS may then be allowed to execute, and may serve as an RTM for the Master Boot Record (MBR) 402. The MBR can be measured into a PCR, then the MBR 402 may be allowed to execute. The MBR may measure a boot sector component 403, which is then allowed to execute. This pattern of loading, measuring, writing to a PCR, and then transitioning to a subsequent component can be repeated by each component 404, 405, 406, and 407, as well as components in the Operating System 407 as necessary.

The exemplary secure boot process may request and use secrets at any point along the way, as such requests are illustrated in FIG. 5. The requested secrets may be those that are used to decrypt and/or encrypt data stored on a disk partition. The disabling of such secrets in accordance with the invention is discussed below.

Exemplary Systems and Methods for Disabling Access to Data

Using a secure boot process such as that described above, secrets can be securely sealed. These secrets may play a role in the secure boot process itself. They may additionally be used to decrypt and/or encrypt some or all of the data that is stored on a particular computer readable medium. In various embodiments, full-volume encryption, i.e. the encryption of substantially all the data in a partition, can be supported using a secure boot process such as that described above.

A decryption process 602 such as that illustrated in FIG. 6 may utilize the secret 601 that is available as a result of the successful operation of a secure boot process 600. The decryption process may decrypt data stored in one or more partitions 603, 605, and 607. Various embodiments may decrypt all data that is to be used by the computer as it is needed, and re-encrypt it when it is no longer needed. Embodiments of the invention may thus include an encryption mechanism (not shown) along with the decryption process 602. The encryption process may utilize the same key 601 as the decryption process, or may use another key in an asymmetrical key arrangement.

Some embodiments may use of a single secret 601 for the various partitions 603, 605, 607, while other embodiments may make use multiple secrets in the place of 601. Such multiple secrets may be dedicated each to a partition, or they may be dedicated to a single partition. The invention is not limited to the location or proportion of encrypted data, nor is it limited to the number of secrets needed to decrypt such data.

As illustrated in FIG. 6, certain portions of an otherwise encrypted partition such as 603, 605, and 607 may never enter an encrypted state, as represented by 604, 606, and 608. Preferred embodiments may encrypt all but these dedicated portions of a partition. When substantially all data is encrypted in this fashion, all relevant data on a partition can be is effectively destroyed by disabling a secret 601. A user of the invention can be confident that any and all sensitive or valuable data is wiped from the partition, leaving no possibility of stray data in an unexpected location.

Referring to FIG. 8, the invention can trivialize the effort required to destroy secrets and thereby to destroy the critical information needed to access data on a computer. In this regard, any primary secrets 601 can be disabled 801. Next, any recovery secrets can be disabled 802. Recovery secrets are explained below with reference to FIG. 7. FIG. 8 can be modified to omit step 802 if it is desired to leave a backdoor through which data can be recovered. Those in possession of a recovery secret will be able to access the encrypted data in the future. This effective destruction, or quasi-destruction of data may be valuable in certain settings, in particular, where it is desired to dispose of sensitive data, and more particularly to dispose of such data quickly. An advantage to embodiments of the invention is that all data on a partition, or an entire machine, can be quickly wiped regardless of its distribution. Elimination of the secrets required to operate computers that implement the invention can render such computers unusable without re-installation of software, and can permanently prevent access to data thereon.

A variety of mechanisms are available to disable a secret 601. First, a secret may simply be erased from its location in memory. In embodiments using a TPM-secured boot process, as described above, the secrets stored inside of the TPM may be reset. This can be done by changing the ownership of the TPM. Any secrets sealed by the TPM are no longer valid. Secrets may also be destroyed by destroying the processes, e.g. 600, 602 that access such secrets. If any processes either allow access to a secret or permit effective use of the secret are disabled, the secret is effectively lost. For example, in a computer with a secure boot process 600, if one of the measured boot components changes, PCR values will not properly load and access to the secret 601 available only after successful completion of the boot process 600 is lost.

Exemplary Systems and Methods for Repairing and Upgrading a Protected Boot Process FIG. 7 illustrates an embodiment of the invention wherein a secondary recovery mechanism 709 is available. A secondary recovery mechanism is a process whereby a secret 710 can be made available if for any reason the primary secret 701 becomes inaccessible. Embodiments of the invention can provide a choice of whether to destroy a secondary recovery mechanism secret 710. Just as with the primary secret 701 case, the secondary recovery mechanism 709 itself may be destroyed instead of, or in addition to, disabling the secondary recovery secret 710.

The invention is not limited to the particular implementation of a recovery mechanism 709. Rather, the secrets 710 used or made available via any recovery mechanism 709. Embodiments of a recovery mechanism 709 may incorporate processes for diagnosing and repairing, as well as upgrading the systems and methods for securely booting a computer. Such processes may involve any number of secrets 710 for bypassing the security features of a secure boot process 700. Embodiments of the invention may, but need not, destroy such "back-up secrets" 710 in addition to the "primary" secrets 701 for accessing encrypted data.

A typical recovery process 709 may contain processes for determining what in a secure boot process failed by inspecting the logs created by the TCG compliant BIOS. This information can then be used to diagnose the problem to give more informative feedback when the error is accidental rather than intentional.

When a secure boot process 700 yields an error, two resolution paths may be available to a recovery process 709. First, using the information obtained from inspecting the logs, a system may be returned to a state that can be considered valid. To disable this type of recovery, logs may be erased, recovery processes may be altered, or secrets needed to access key functional elements can be disabled.

Second, a user may authenticate that the system should be considered valid. To disable this type of recovery, the secrets available to a user may be voluntarily submitted for disablement. For example, if the hardware on the machine is broken and the disk was migrated to another otherwise identical machine; the TPM's secret key may be different. In this case, a user may be authenticated instead of the machine. The credentials for this need not be easily accessible, and can require for example, a phone-call, to re-enable the machine. In such embodiments, the user may call the appropriate number and advise that he or she wishes to disable the recovery mechanism 709.

If the recovery mechanism 709 and or recovery secret 710 is not disabled along with the primary secret 701 or primary secret enabling processes 600, 602, a machine may be temporarily disabled and then later recovered. Otherwise, when both the primary secret 701, such as those secrets stored in the TPM, and any recovery mechanism secrets 710 are disabled, the encrypted data, e.g. 703 of a machine becomes unobtainable. This very quickly accomplishes a security wipe of a machine.

What is claimed:

1. A computer comprising a mechanism for disabling access to at least one secret for booting an operating system that provides access to encrypted data stored on a computer readable medium, comprising:
   means for securely booting the computer, comprising:
      a Hardware Security Module (HSM);
      a component that performs a trusted measurement of at least one boot component and submits a trusted measurement value to the HSM;
      wherein said HSM compares said trusted measurement value to an HSM sealed value to authenticate said at least one boot component, and wherein said HSM unseals at least one secret when said at least one boot component is authentic;
   means for decrypting a subsequent boot component using said at least one secret;

means for disabling said at least one secret comprising means for resetting said HSM sealed value to disable said at least one secret.

2. The computer of claim 1, wherein said encrypted data stored on a computer readable medium is a subset of the data that may be accessed by the computer.

3. The computer of claim 1, wherein the at least one secret is a secret needed by the means for securely booting the computer to successfully boot the computer.

4. The computer of claim 1, wherein said means for disabling comprises means for altering said at least one boot component to disable said at least one secret.

5. A computer readable storage medium bearing instructions for disabling access to at least one secret for booting an operating system that provides access to encrypted data stored on a computer readable medium, comprising:

instructions for securely booting the computer, comprising instructions for performing a trusted measurement of at least one boot component and submitting a trusted measurement value to a Hardware Security Module (HSM);

instructions for receiving a secret from said HSM, wherein said HSM compares said trusted measurement value to an HSM sealed value to authenticate said at least one boot component, then unseals said secret;

instructions for decrypting a subsequent boot component using said at least one secret;

instructions for disabling said at least one secret comprising instructions for resetting said HSM sealed value to disable said at least one secret.

6. The computer readable storage medium of claim 5, wherein said encrypted data stored on a computer readable medium is a subset of the data that may be accessed by the computer.

7. The computer readable storage medium of claim 5, wherein said instructions for disabling comprise instructions for altering said at least one boot component to disable said at least one secret.

8. A method for disabling access to at least one secret for booting an operating system that provides access to encrypted data stored on a computer readable medium, comprising:

in a computer equipped with a Hardware Security Module and instructions for securely booting the computer, wherein said instructions for securely booting comprise instructions for performing a trusted measurement of at least one boot component, submitting a trusted measurement value to said HSM, receiving at least one secret from said HSM and decrypting a subsequent boot component using said at least one secret:

decrypting said subsequent boot component;

initiating a process for locating and disabling said at least one secret; and     disabling said at least one secret, wherein disabling comprises resetting said HSM sealed value to disable said at least one secret.

9. The method of claim 8, wherein the at least one secret is a secret needed to successfully boot the computer.

10. The method of claim 8, wherein disabling comprises altering said at least one boot component to disable said at least one secret.

\* \* \* \* \*